(12) United States Patent
Payne et al.

(10) Patent No.: US 7,085,059 B2
(45) Date of Patent: Aug. 1, 2006

(54) SPATIAL LIGHT MODULATOR WITH ROBUST MIRROR SUBSTRATE CONDITION

(75) Inventors: Alexander P. Payne, Ben Lomond, CA (US); James A. Hunter, Campbell, CA (US); David T. Amm, Sunnyvale, CA (US)

(73) Assignee: Silicon Light Machines Corporation, Sunnyvale, CA (US)

( * ) Notice: Subject to any disclaimer, the term of this patent is extended or adjusted under 35 U.S.C. 154(b) by 0 days.

(21) Appl. No.: 11/087,230

(22) Filed: Mar. 23, 2005

(65) Prior Publication Data

US 2005/0212004 A1 Sep. 29, 2005

Related U.S. Application Data

(60) Provisional application No. 60/555,912, filed on Mar. 24, 2004.

(51) Int. Cl.
G02B 1/10 (2006.01)
(52) U.S. Cl. ............... 359/584; 359/586; 359/589; 359/290
(58) Field of Classification Search ........ 359/290–292, 359/577, 580, 584, 585, 586, 589
See application file for complete search history.

(56) References Cited

U.S. PATENT DOCUMENTS

| | | | |
|---|---|---|---|
| 5,568,316 A * | 10/1996 | Schrenk et al. | 359/584 |
| 5,978,133 A * | 11/1999 | Gillich | 359/584 |
| 5,978,141 A * | 11/1999 | Karwacki | 359/586 |
| 5,999,306 A | 12/1999 | Atobe et al. | |
| 6,067,189 A * | 5/2000 | Gillich | 359/584 |
| 6,107,115 A | 8/2000 | Atobe et al. | |
| 6,231,992 B1 * | 5/2001 | Niebauer et al. | 359/586 |
| 6,271,955 B1 | 8/2001 | Atobe et al. | |
| 6,452,712 B1 | 9/2002 | Atobe et al. | |
| 6,643,052 B1 * | 11/2003 | Goossen | 359/290 |
| 6,650,461 B1 | 11/2003 | Atobe et al. | |
| 6,882,461 B1 * | 4/2005 | Tsai et al. | 359/290 |
| 6,934,070 B1 * | 8/2005 | Maheshwari et al. | 359/290 |
| 6,954,309 B1 * | 10/2005 | Knobloch et al. | 359/586 |
| 2004/0001257 A1 * | 1/2004 | Tomita et al. | 359/572 |
| 2004/0217378 A1 * | 11/2004 | Martin et al. | 257/200 |
| 2006/0057754 A1 * | 3/2006 | Cummings | 438/48 |

* cited by examiner

Primary Examiner—Evelyn A. Lester
(74) Attorney, Agent, or Firm—Okamoto & Benedicto LLP

(57) ABSTRACT

A light modulator and a method of manufacturing the same are provided having a substrate with reflectivity enhancing layers formed thereon. The layers include at least a top surface for receiving incident light, a first layer overlying the substrate, and a second layer between the top surface and the first layer, the second layer overlying and abutting the first layer. The second layer has a predetermined thickness selected in relation to an index of refraction of the second layer and to a wavelength of the incident light such that the light reflecting off an interface between the first and second layers constructively interferes with light reflected from the top surface. Preferably, the first layer also has a predetermined thickness selected such that the light reflecting off an interface between the first layer and the substrate constructively interferes with light reflected from the top surface.

20 Claims, 9 Drawing Sheets

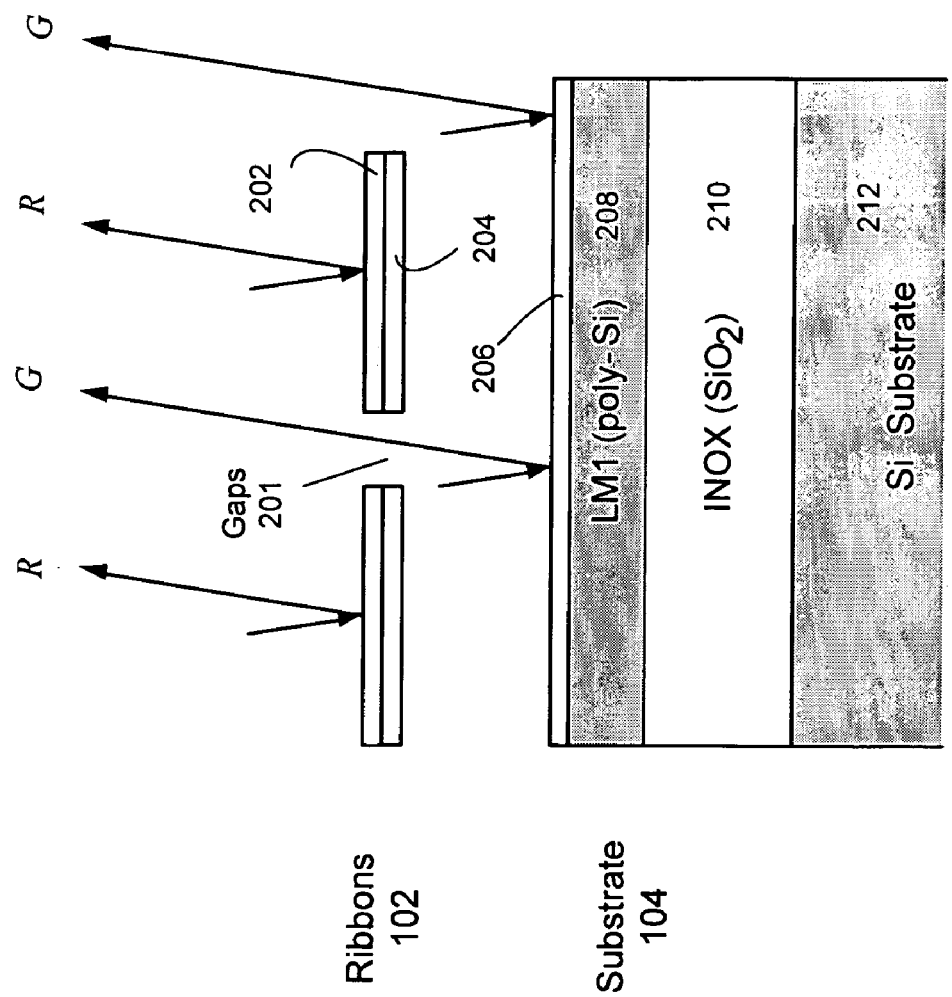
FIG. 2 (conventional)

| | | |
|---|---|---|
| $\lambda_0$ (nm) | 808 |
| $n_{Poly-Si}$ | 4.32 |
| $\lambda_{Poly-Si}/4$ (nm) | 46.8 |
| $n_{Oxide}$ | 1.44 |
| $\lambda_{Oxide}/4$ (nm) | 140.8 |

| $\lambda/4$'s (-) | $t_{LM1}$ (nm) | $t_{INOX}$ (nm) |
|---|---|---|
| 1 | 46.8 | 140.8 |
| 3 | 140.3 | 422.3 |
| 5 | 233.8 | 703.8 |
| 7 | 327.3 | 985.4 |
| 9 | 420.8 | 1266.9 |
| 11 | 514.4 | 1548.4 |
| 13 | 607.9 | 1830.0 |

FIG. 7

SPATIAL LIGHT MODULATOR WITH ROBUST MIRROR SUBSTRATE CONDITION

CROSS-REFERENCE TO RELATED APPLICATIONS

The present application claims the benefit of U.S. provisional application No. 60/555,912, entitled "Spatial Light Modulator Having a Mirrored Substrate and Method of Fabricating Same," filed Mar. 24, 2004, by inventors Alexander P. Payne, James A. Hunter, and David T. Amm, the disclosure of which is hereby incorporated by reference.

TECHNICAL FIELD

The present invention relates generally to spatial light modulators, and more particularly to a spatial light modulators having a substrate with reflectivity enhancing layers and methods of manufacturing and using the same.

BACKGROUND OF THE INVENTION

Spatial light modulators (SLMs) are devices or arrays of multiple devices that can control or modulate an incident beam of light in a spatial pattern that corresponds to an electrical input to the devices. The incident light beam can be modulated in intensity, phase, polarization or direction. Some modulation can be accomplished through the use of Micro-Electromechanical System devices or MEMS that use electrical signals to move micromechanical structures to modulate light incident thereon.

One type of SLM is a ribbon light modulator, such as a Grating Light Valve™ (GLV®) commercially available from Silicon Light Machines Corporation of Sunnyvale, Calif. Referring to FIG. 1, the ribbon light modulator generally includes a number of ribbons 102 each having a light reflective surface supported over a reflective surface of a substrate 104. Each ribbon 102 may be deflectable toward the substrate 104 to form an addressable diffraction grating with adjustable diffraction strength. The ribbons 102 are electrostatically deflected towards the substrate 104 by integrated drive electronics formed in or on the surface of the substrate.

It is highly desirable to improve light modulators. In particular, there is a need to improve a light modulator having a substrate with a mirrored or highly reflective surface and to improve a method of manufacturing the same. It is desirable that light modulators be produced having uniform reflectivity between wafer lots. It is further desirable that any treatment or modification of surface layers on the substrate not interfere with or adversely effect any underlying circuits formed in an electronically active substrate.

SUMMARY OF THE INVENTION

The present invention provides a solution to these and other problems, and offers further advantages over conventional spatial light modulators.

In one aspect, the present invention is directed to a light modulator for modulating light incident thereon. Generally, the light modulator includes a substrate having a number of reflectivity enhancing layers formed thereon. The reflectivity enhancing layers include at least a top surface for receiving light incident on the light modulator, a first layer overlying the substrate, and a second layer between the top surface and the first layer, the second layer overlying and abutting the first layer. The second layer has a predetermined thickness. In accordance with the present invention, the thickness of the second layer is selected in relation to its refractive index and a wavelength of the incident light such that the light passing through the second layer and reflecting off an interface between the first and second layers constructively interferes with light reflected from the top surface. Preferably, the first layer also has a predetermined thickness, and the thickness of the first layer is selected in relation to its refractive index and the wavelength of incident light such that the light passing through the first layer and reflecting off an interface between the first layer and the substrate constructively interferes with light reflected from the top surface.

In one embodiment, the substrate is electrically active having an electrode and/or drive electronics below the first layer, and the first layer is a dielectric layer and the second layer is a conductive interconnect layer. In one version of this embodiment, the thickness of the second layer is also selected to provide a desired resistance of the conductive interconnect layer, and the thickness of the first layer is further selected to reduce capacitive coupling between underlying electrically active substrate and the overlying conductive interconnect layer. Preferably, the first and second layers each have thicknesses substantially equal to an odd multiple of a quarter wavelength of the light within that layer. In one specific embodiment, the first and second layers have thicknesses substantially equal to seven quarters of the wavelength of the light within that layer.

Although embodiments described heretofore include only two reflectivity enhancing layers, it will be appreciated that the light modulator according the present invention can include any number of reflectivity enhancing layers each having a thickness equal to an odd multiple of a quarter wavelength of the light within that layer.

It will also be appreciated that the light modulator having a substrate with reflectivity enhancing layers according to the present invention is particularly useful in a ribbon light modulator having a number of reflective ribbons disposed above the substrate with gaps between the ribbons.

In another aspect a method is provided for manufacturing a light modulator including a substrate with reflectivity enhancing layers formed thereon. Generally, the method involves: (i) forming a first layer on the substrate; and (ii) forming a second layer overlying and abutting the first layer. In accordance with the present invention, the second layer has a predetermined thickness selected in relation to a wavelength of light incident on a top surface of the reflectivity enhancing layers such that light passing through the second layer and reflecting off an interface between the first and second layers constructively interferes with light reflected from the top surface. Preferably, the step of forming a first layer involves forming a first layer overlying and abutting the substrate, having a predetermined thickness selected such that the light passing through the first layer and reflecting off an interface between the first layer and the substrate constructively interferes with light reflected from the top surface.

BRIEF DESCRIPTION OF THE DRAWINGS

These and various other features and advantages of the present invention will be apparent upon reading of the following detailed description in conjunction with the accompanying drawings and the appended claims provided below, where:

FIG. 2 is a cross-sectional side view of ribbon type spatial light modulator illustrating net reflectivity of the modulator is a vector sum of light (R) reflected from the ribbons and light (G) reflected from a substrate gaps in the ribbons;

FIG. 7 provides a table with calculations of odd multiples of one-quarter wavelength for LM1 and INOX layers.

DETAILED DESCRIPTION

Figure 1:
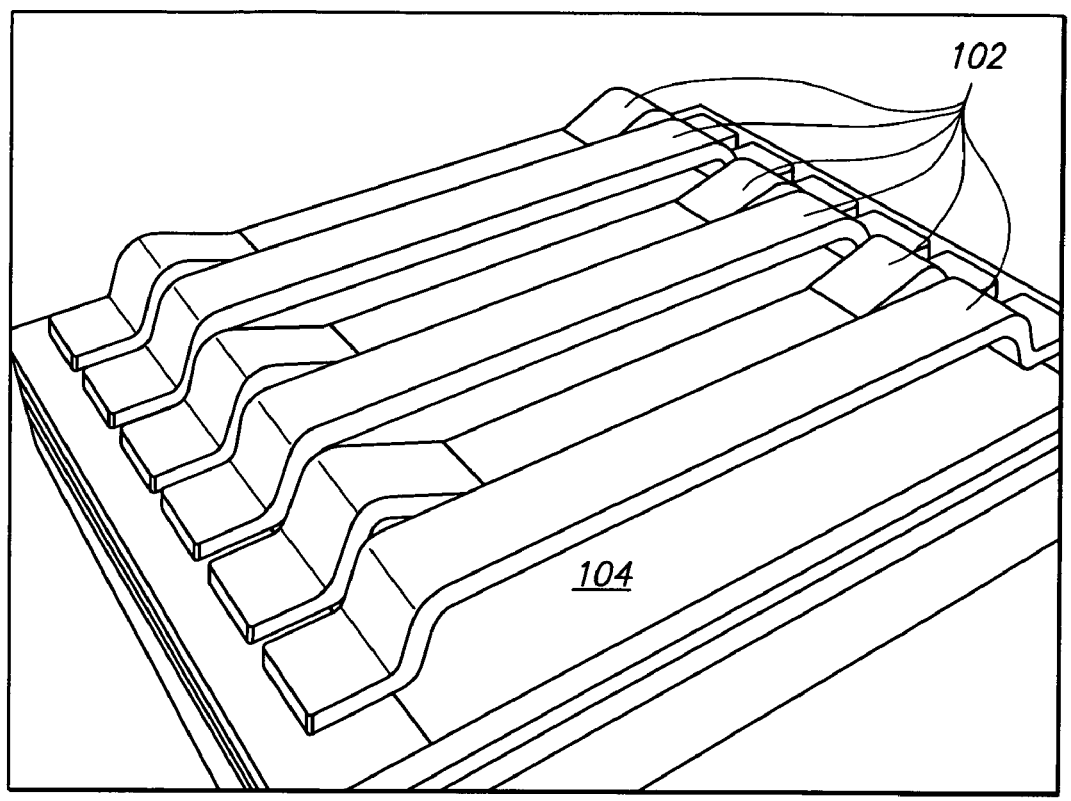
FIG. 1 is a perspective view of a conventional ribbon type spatial light modulator.

The present invention relates generally to spatial light modulators, and more particularly to diffractive spatial light modulators (SLMs) having a mirrored, or highly reflective substrate and methods of manufacturing and using the same.

Although, in theory, the efficiency of these modulators may be as high as 70% to 80%, in the past manufacturers have typically struggled to consistently deliver device efficiencies above 60%. Historically, there is significant lot-to-lot variations in device efficiency. Although efficiency is influenced by many factors (sacrificial layer or SAC thickness, ribbon bow, Aluminum reflectivity, and other factors), a known source of variation is the reflectivity of the surface of the modulator substrate 104.

FIG. 2 shows a cross-section through the ribbon light modulator. Most of the light (R) is reflected from the ribbons 102, but some light (G) propagates through the gaps 201 and is reflected from the substrate 104. The ribbons 102 may comprise a reflective layer 202 over a support layer 204. The substrate 104 may comprise a thin oxide layer 206, over poly-silicon electrode layer (LM1) 208, over a thermal oxide layer (INOX) 210, over a silicon wafer or substrate 212.

The reflected waves from the ribbons 102 and gaps 201 shown in FIG. 2 add as vectors of magnitude and phase. Although the area of the gaps typically constitutes less than 15% of the surface area of the ribbon light modulator, gap reflectivity (including the phase of the light from the gaps) can cause large changes in net device efficiency. For example, with an 85% fill factor (i.e. 85% ribbon area and 15% gap area) and 100% reflective gaps and ribbons, device reflectivity can vary from 100% to 51% depending on the phase of the light from the gaps.

Figure 3:
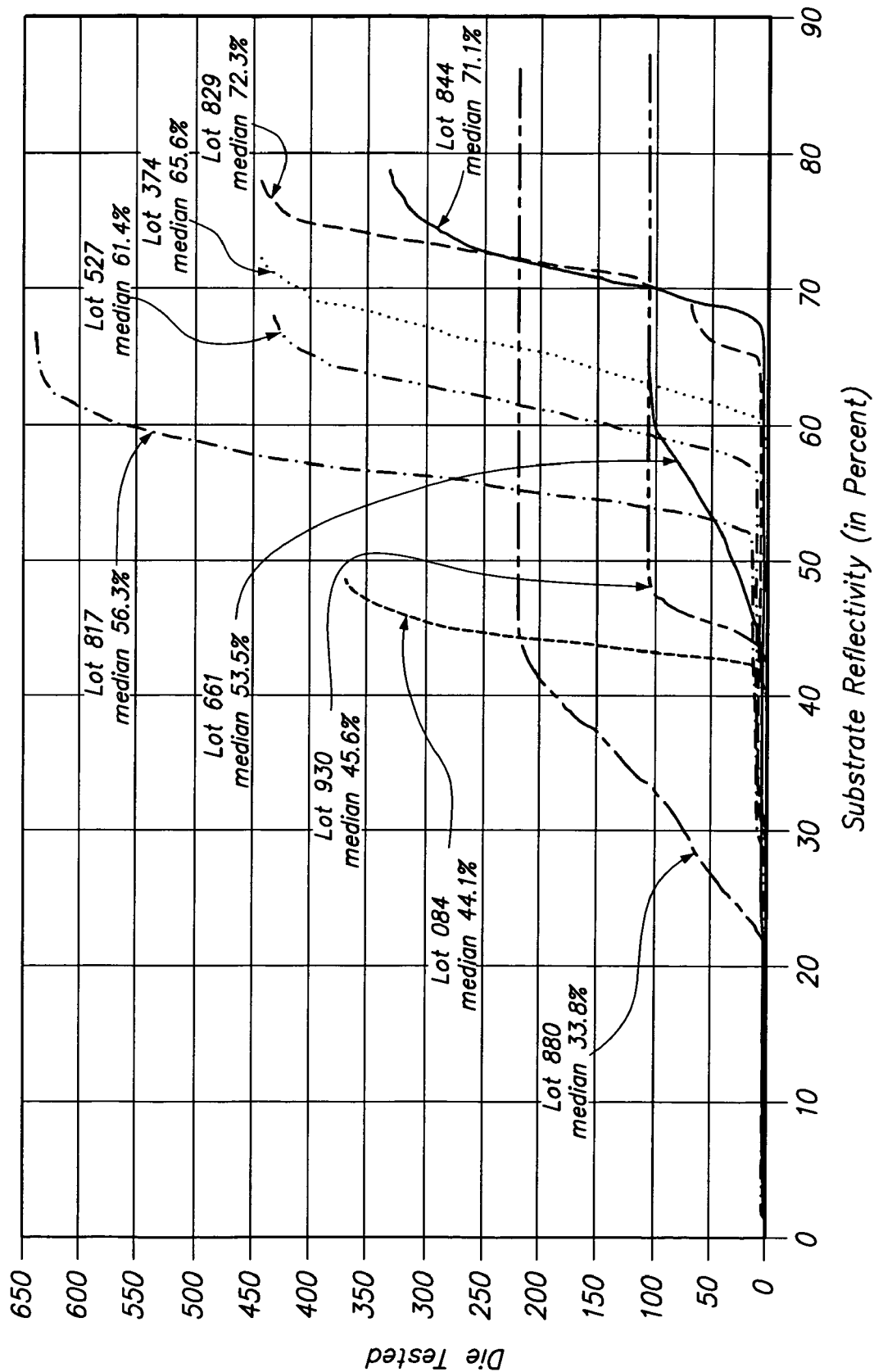
FIG. 3 is a graph of substrate reflectivity randomly selected lots of nominally identical conventionally-manufactured spatial light modulators showing a large variation in substrate reflectivity from 20 to 80%.

FIG. 3 shows a summary of substrate reflectivity from a series of conventionally-manufactured wafer lots. The plot shows reflectivity can vary from about 20% to about 80%. This is quire a large range of variation. Since each lot of wafers is centered on a specific substrate reflectivity, applicants believe that the variations are primarily due to the film structure of the wafer and not primarily due to back-end processing.

Figure 4:
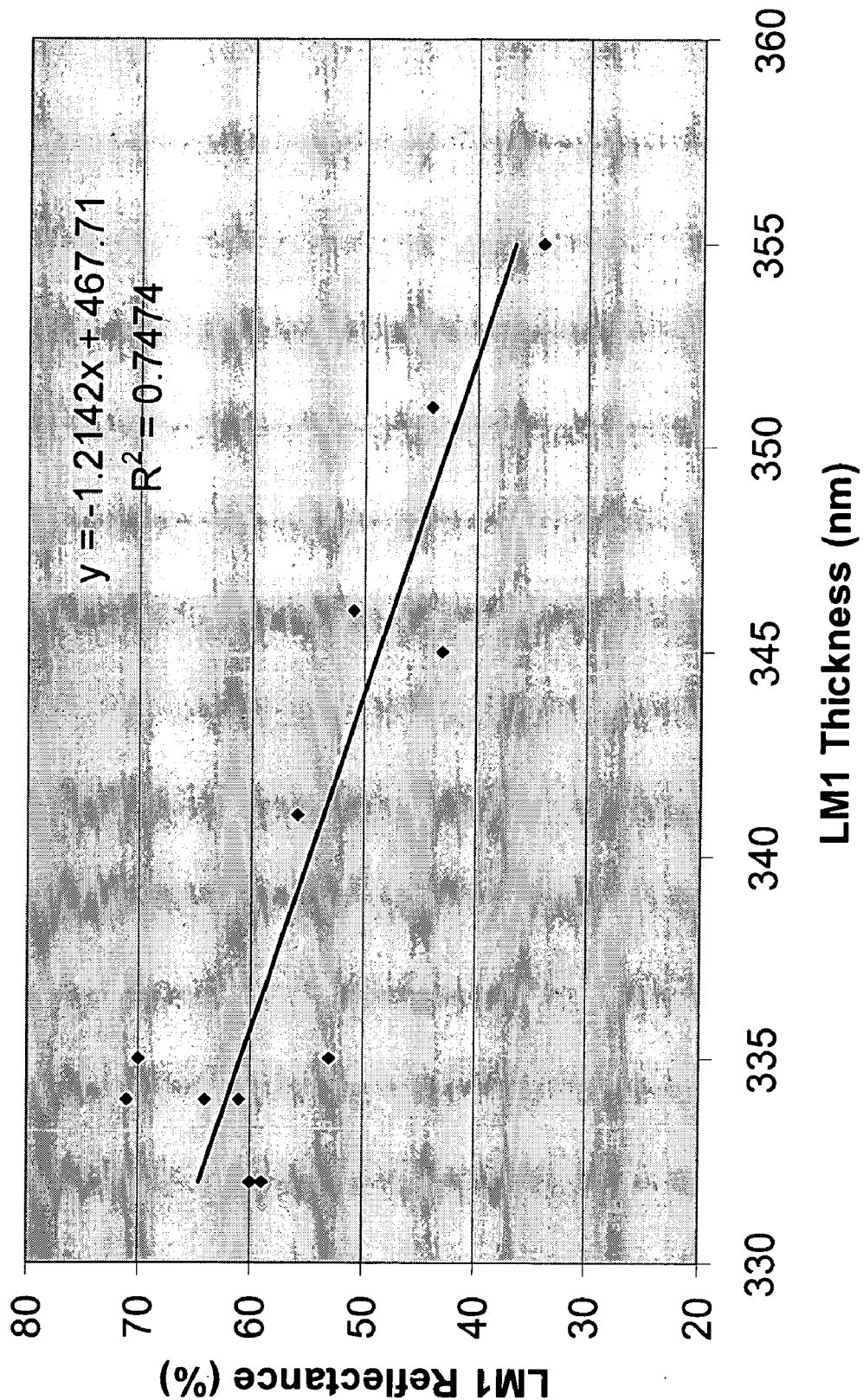
FIG. 4 is a graph showing correlation between substrate reflectivity and LM1 thickness for conventionally manufactured spatial light modulators.

FIG. 4 shows a correlation between substrate reflectivity and measured poly-silicon electrode (LM1) thickness for conventionally-manufactured spatial light modulators. Each point represents averaged reflectivity of a wafer lot. Note that as shown in FIG. 4 reflectance varies from about 65% to 35% over about 25 nm of LM1 thickness. The correlation shown in FIG. 4 provides further support for variations in the structure of the wafer being a primary cause of substrate reflectivity variations.

A SLM according to the present invention will now be described with reference to FIGS. 5 through 8. For purposes of clarity, many of the details of SLMs in general and diffractive and ribbon type SLMs in particular that are widely known and are not relevant to the present invention have been omitted from the following description. Moreover, although described below with reference to ribbon type SLMs, it will be appreciated that the method of and reflectivity enhancing layers of the present invention can be used with any type of light modulator having a substrate (or actuator) with a highly reflective surface, including tilt mirror light modulators and diaphragm type light modulators.

As noted above, and shown in FIG. 1, a ribbon type SLMs generally includes a number of ribbons 102 each having a light reflective surface supported over a reflective surface of a substrate 104. Each ribbon 102 may be deflectable toward the substrate 104 to form an addressable diffraction grating with adjustable diffraction strength. The ribbons 102 are electrostatically deflected towards the substrate by integrated drive electronics formed in or on the surface of the substrate 104.

In accordance with the present invention the substrate 104 of the light modulator includes a number of reflectivity enhancing layers. Each of the reflectivity enhancing layers have refractive indices and thicknesses selected in relation to a desired wavelength of light such that the light passing through at least one of the layers and reflecting off an interface between the layer and a underlying layer, or off an interface between the layer and the substrate, constructively interferes with light reflected from a top surface of the reflectivity enhancing layers. In one embodiment, this occurs when each of the reflectivity enhancing layers is an odd multiple of $\lambda/4$ thick, where $\lambda$ is the wavelength of light within the respective layer.

Figure 5:
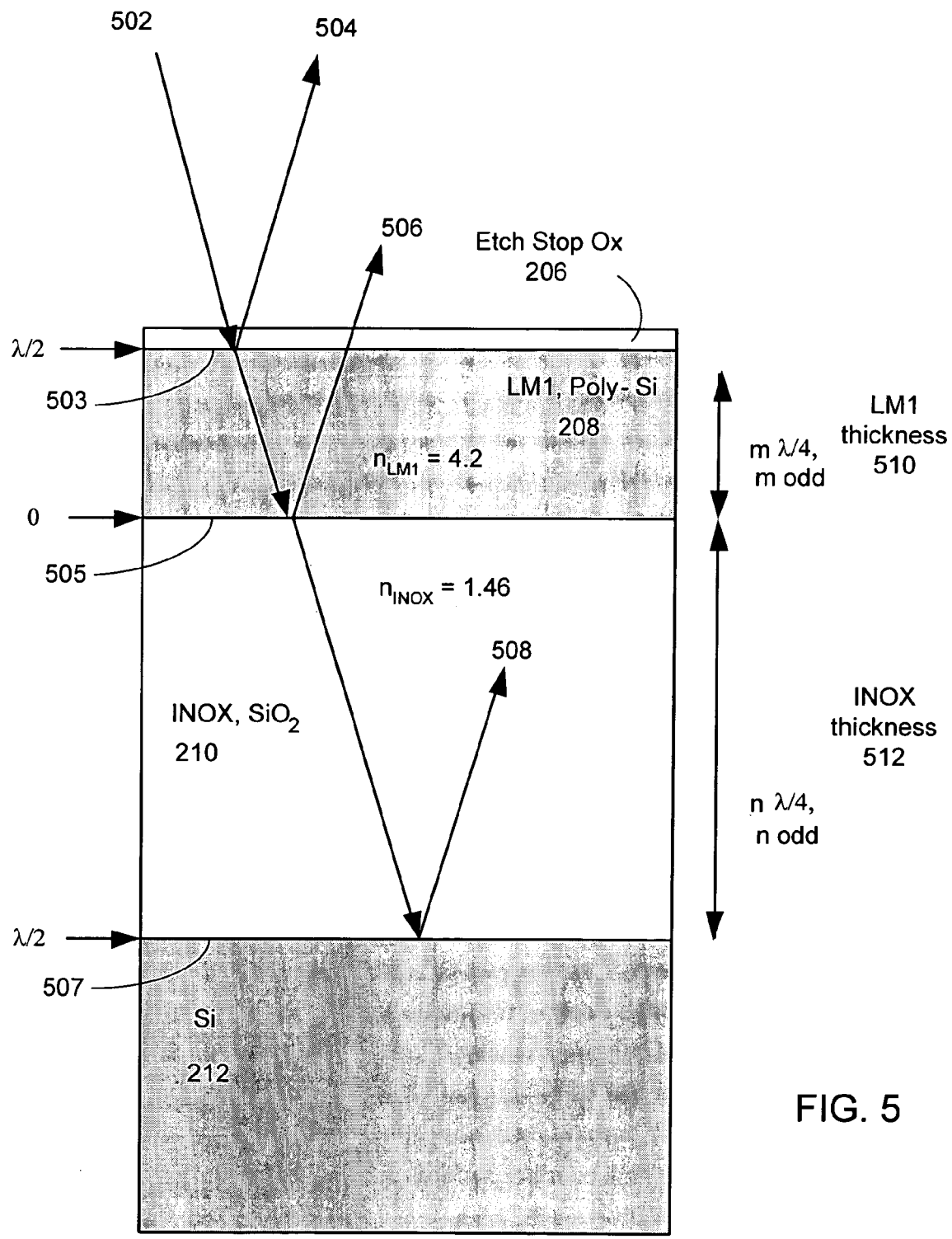
FIG. 5 is a cross-sectional side view of a substrate of a spatial light modulator having reflectivity enhancing layers according to an embodiment of the present invention.

A substrate film stack having reflectivity enhancing layers according to an embodiment of the invention is shown in FIG. 5. Starting with a bare substrate 212, such as a silicon wafer, a thick layer of thermal oxide layer (INOX) 210 is grown first. This layer 210 serves to electrically isolate conductive layers in the device from the conductive silicon substrate 212. Since capacitance scales as 1/x where x is the capacitor gap, the primary reduction in coupling is achieved within about one micrometer (~1 μm) of INOX, with diminishing effect thereafter. The thermal oxide 210 is followed by a thinner layer of poly-crystalline silicon (LM1) 208. Typically, this layer 208 is the lower device electrode. Since the thickness of LM1 determines the electrical resistance (or conversely, the electrical conductivity) of interconnect lines, it must be above a reasonable level, typically above about three thousand angstroms (~3000 Å). The LM1 layer is capped by a thin layer of oxide (Etch Stop Ox) 206 which may be about 200 Angstroms thick (~200 Å) to protect the poly-silicon LM1 from being etched during the XeF2 release process.

Each of the layers in the substrate 104 serves a specific, non-optical purpose. Hence, its thickness is not a completely free variable and has not heretofore been optimized for optical response. However, through slight modifications to each layer thickness, applicants believe that it is possible to create a net optical response that is (a) highly reflective and (b) relatively insensitive to film thickness variations.

FIG. 5 also shows the interfaces between the various layers of the substrate 104. An Ox-LM1 interface 503 is between the Ox layer 206 and the LM1 layer 208. An LM1-INOX interface 505 is between LM1 layer 208 and the INOX layer 210. A INOX-substrate interface 507 is between the INOX layer 210 and the substrate 212.

An incident light wave 502 is shown in FIG. 5. Each of these interfaces may reflect or partially reflect the incident light 502. The incident light 502 is partially reflected (first reflected light component 504) with a $\lambda/2$ (180 degree) phase shift from the Ox-LM1 interface 503. Consider that this first reflected light component 504 has a phase of $\lambda/2$ at the substrate surface.

The incident light is also partially reflected (second reflected light component 506) with no (0 degree) phase shift from the LM1-INOX interface 505. In addition, this second reflected light component 506 goes through a phase change as it twice travels through the LM1 layer 208. The amount of the phase change depends upon the wavelength $\lambda$ of the light in the LM1 material and the thickness of the LM1 layer 208. The wavelength $\lambda$ of the light depends upon the index of refraction in the LM1 material. In one implementation, the index of refraction $n_{LM1}$=4.2. In accordance with an embodiment of the invention, the thickness 510 of LM1 is controlled such that the thickness 510 is equal to (or substantially equal to) $m\lambda/4$, where m is an odd number. With such an LM1 thickness 510, the second reflected light component 506 has a phase of $m\lambda/2$ which is equivalent to $\lambda/2$ (since m is odd) at the substrate surface. Hence, the second reflected light component 506 is in phase with (and so adds constructively to) the first reflected light component 504 coming off the substrate surface.

The incident light is also reflected (third reflected light component 508) with a $\lambda/2$ (180 degree) phase shift from the INOX-substrate interface 507. In addition, this third reflected light component 508 goes through a phase change as it twice travels through the LM1 layer 208 and also twice travels through the INOX layer 210. The amount of the phase change depends upon the wavelength $\lambda$ of the light in the LM1 and INOX materials and the thicknesses of the LM1 208 and INOX 210 layers. The wavelength $\lambda$ of the light in the INOX layer 210 depends upon the index of refraction in the INOX material. In one implementation, the index of refraction $n_{INOX}$=1.46 In accordance with an embodiment of the invention, the thickness 512 of INOX is controlled such that the thickness 512 is equal to (or substantially equal to) $n\lambda/4$, where n is an odd number. With such an INOX thickness 512, the third reflected light component 508 has a phase of $\lambda/2+m\lambda/2+n\lambda/2$ which is equivalent to $\lambda/2$ (since both m and n are odd) at the substrate surface. Hence, the third reflected light component 508 is in phase with (and so adds constructively to) the first 504 and second 506 reflected light components at the substrate surface.

Figure 6:
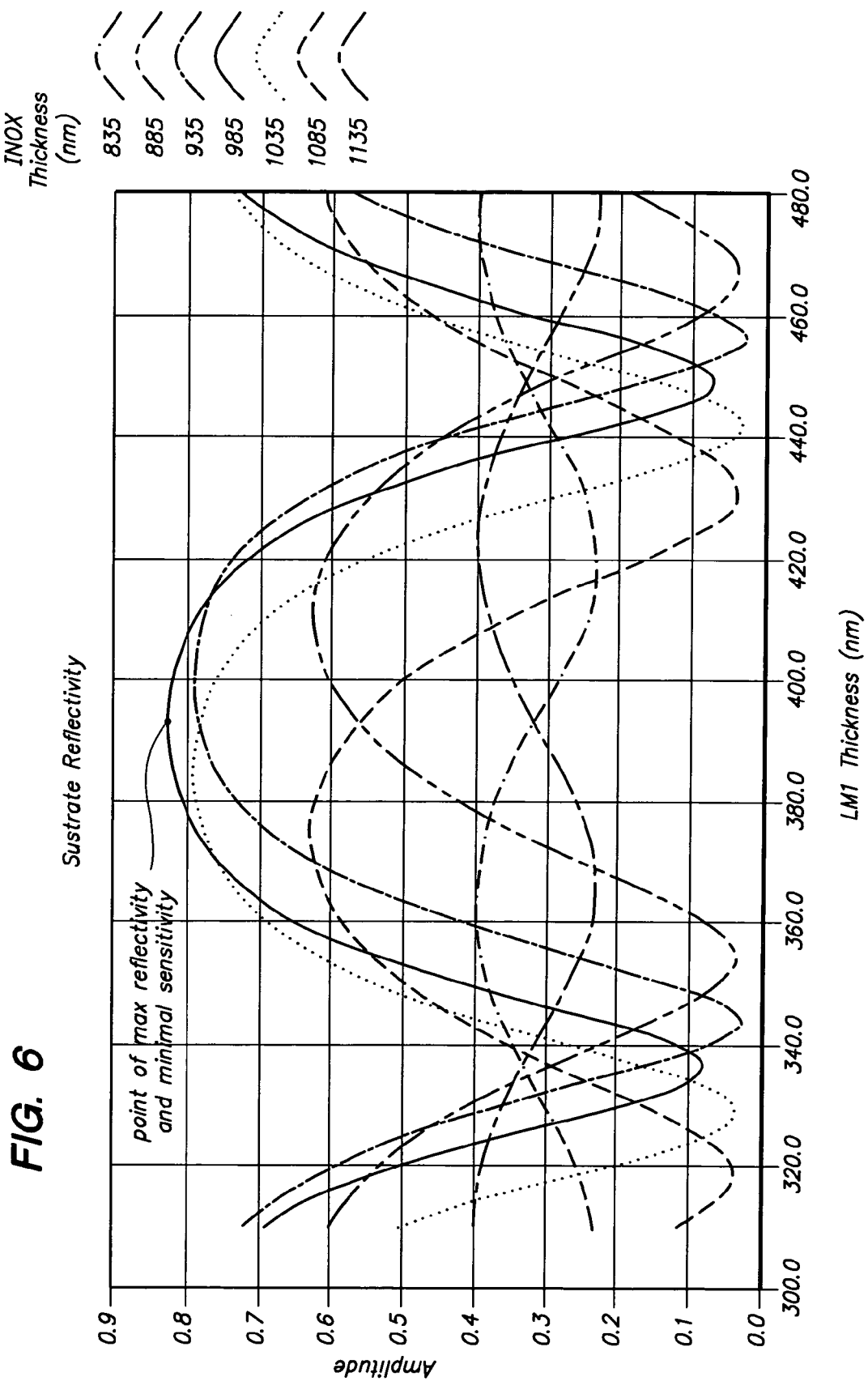
FIG. 6 is a graph of calculated substrate reflectivity as a function of dielectric and LM1 thicknesses for a spatial light modulator operating at a wavelength of 820 nm and having reflectivity enhancing layers according to an embodiment of the present invention.

Computational simulations of the substrate optical response were performed as a function of INOX and LM1 thicknesses. The results are shown in FIG. 6. This plot shows the calculated reflectivity as a function of LM1 thickness 510 (ranging from 310 nm to 480 nm) for a variety of INOX thicknesses 512 (835 nm, 885 nm, 935 nm, 985 nm, 1035 nm, 1085 nm, and 1135 nm). Simulations on the thin oxide etch-stop showed that it is too thin to play a significant role in the optical response of the substrate. The simulated plots in FIG. 6 indicate several noteworthy trends. First, there are some choices of INOX thickness 512 (for example, 835 nm and 1135 nm) that produce low reflectivity for all LM1 thicknesses 510. Second, there are choices of LM1 thickness 510 which lead to poor reflectivity (local minima). Third, there are choices of LM1 510 for which reflectivity is changing rapidly with thickness (i.e. the magnitude of dR/dt is high, where R represents LM1 reflectivity and t represents thickness). These are poor design points since small thickness variations cause large changes in reflectivity and phase. Fourth, there is a point of symmetry in the middle of the graph at INOX thickness 512 985 nm and LM1 thickness 510 around 390 nm, where reflectivity is maximum, and reflectivity slope dR/dt is minimum with respect to both INOX and LM1 film thickness. That dR/dt is minimum with respect to LM1 thickness 510 is shown by the flatness of the INOX 985 nm curve near 390 nm. That dR/dt is minimum with respect to INOX thickness 512 is shown by the closeness of the INOX 935 µm and INOX 1035 nm curves. Simulations of the phase of the reflected waves similarly show a broad region near this point where the phase slope (dΦ/dt) is also minimum. This is the optimum design point, the "mirror substrate" condition. As shown in FIG. 6, the point of maximum reflectivity and minimal sensitivity to film thickness variations is the peak of the INOX 985 nm curve. In accordance with an embodiment of the invention, such a design point represents the desired robust "mirror substrate" condition.

The robust "mirror substrate" condition is achieved by enforcing constructive interference among each of the buried interfaces. Constructive interference occurs when each material slab (LM1 and INOX) thickness is and odd multiple of $\lambda/4$, where $\lambda$ is the wavelength of the light inside the film layer. When light ($\lambda_0$) enters the LM1 material, its wavelength is reduced to $\lambda_0/n_{LM1}$, where $n_{LM1}$ is the refractive index of the material ($\lambda=\lambda_0/n_{LM1}$). When light ($\lambda_0$) enters the INOX material, its wavelength is reduced to $\lambda_0/n_{INOX}$, where $n_{INOX}$ is the refractive index of the material ($\lambda=\lambda_0/n_{INOX}$).

FIG. 7 includes a table with calculations of the odd multiples of $\lambda/4$ for the LM1 and INOX layers. Although any combination of the listed thicknesses will work optically (in principle, the odd multiple need not be the same for the LM1 and INOX layers), the $7\lambda/4$ combination (i.e. the combination where both odd multiples are seven) is highlighted since this is closest to the thicknesses chosen for electrical reasons.

A series of films were prepared to experimentally verify the mirror substrate design point. A matrix of five INOX thicknesses multiplied by nine LM1 thicknesses was prepared on blank wavers. The reflectivity of each substrate was measured spectroscopically. An excerpt of this study is shown in FIGS. 8 and 9.

Figure 8:
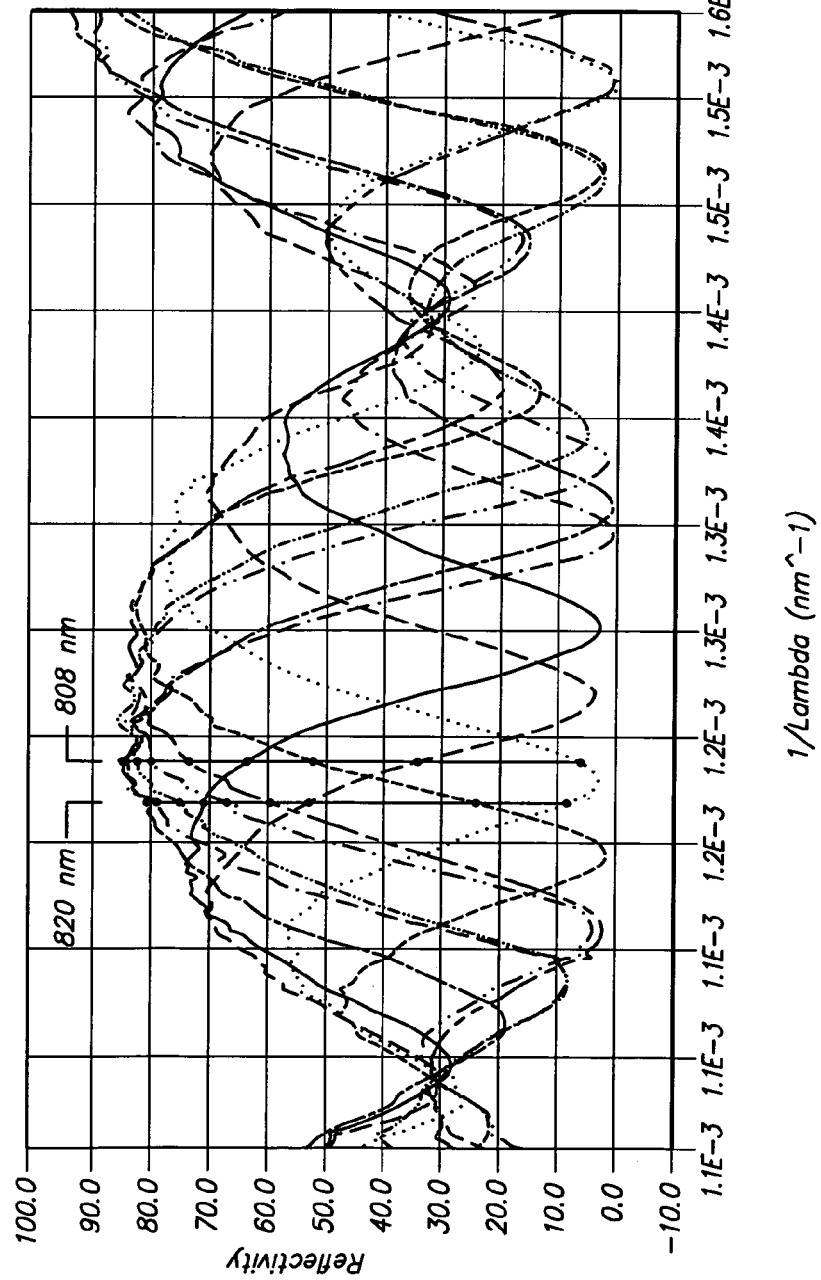
FIG. 8 is a graph of measured substrate reflectivity as a function of wavelength of incident light for a substrate having 9500 Å dielectric layer and a LM1 layer of from 3000 to 4600 Å according to an embodiment of the present invention.

FIG. 8 is a graph of experimental results showing reflectivity spectrum (plotted as $1/\lambda$) for various LM1/INOX thickness combinations where INOX is about 9500 Å. The reflectivities are specifically shown on the right of FIG. 8 for both $\lambda_0$=820 nm ("R 820") and $\lambda_0$=808 nm ("R 808").

Figure 9:
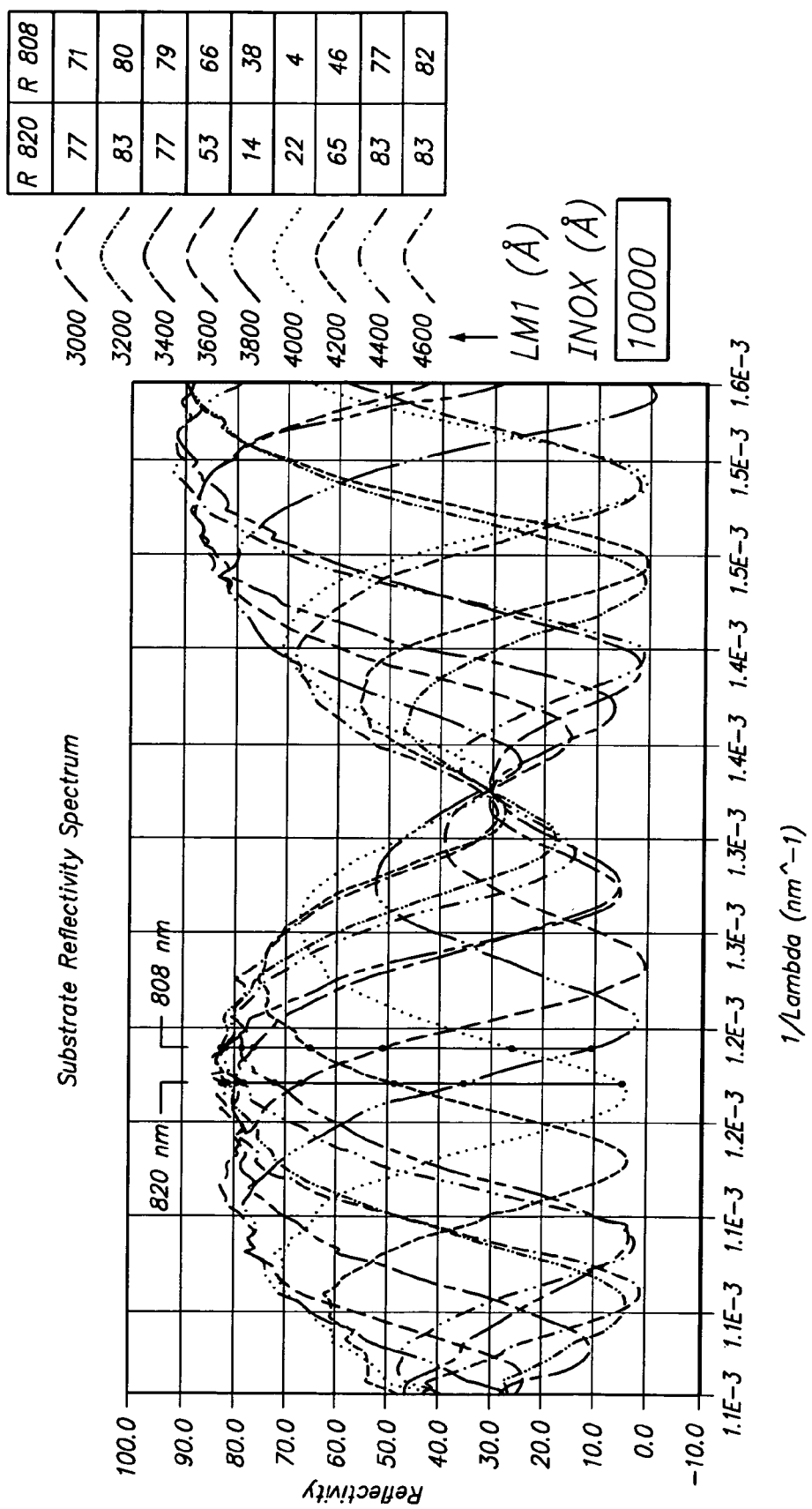
FIG. 9 is a graph of measured substrate reflectivity as a function of wavelength of incident light for a substrate having 10000 Å dielectric layer and a LM1 layer of from 3000 to 4600 Å according to another embodiment of the present invention.

Similarly, FIG. 9 is a graph of measured substrate reflectivity as a function of wavelength of incident light for a substrate having a INOX layer of about 10000 Å. In both instances, the "mirror substrate" condition was experimentally verified at 9850 Å INOX and 3275 Å LM1 for wavelengths from 808 to 820 nm. This point corresponds to 1.75 wavelengths for each material.

Note that while the calculated simulation of FIG. 6 indicates a LM1 thickness around 390 nm, the experimental data of FIGS. 8 and 9 indicate LM1 thickness around 327 nm for the robust mirror condition. This difference is believed to be due to the differences in textbook (SOPRA database) versus actual measured values of the refractive indices for the materials.

The foregoing description of specific embodiments and examples of the invention have been presented for the purpose of illustration and description, and although the invention has been described and illustrated by certain of the preceding examples, it is not to be construed as being limited thereby. They are not intended to be exhaustive or to limit the invention to the precise forms disclosed, and many modifications, improvements and variations within the scope of the invention are possible in light of the above teaching. It is intended that the scope of the invention encompass the generic area as herein disclosed, and by the claims appended hereto and their equivalents.

What is claimed is:

1. A light modulator for modulating light incident thereon, the modulator including a substrate having a plurality of reflectivity enhancing layers formed thereon, said plurality of reflectivity enhancing layers comprising at least:
   a top surface for receiving light incident on the light modulator;
   a first layer overlying the substrate;
   a second layer between the top surface and the first layer, the second layer overlying and abutting the first layer; and
   wherein the second layer has a predetermined thickness which depends upon a wavelength of the light in the second layer, and the predetermined thickness of the second layer is such that the light passing through the second layer and reflecting off an interface between the first and second layers constructively interferes with the light reflected from the top surface.

2. A light modulator according to claim 1, wherein the first layer has a predetermined thickness which depends upon a wavelength of the light the first layer, and the predetermined thickness of the first layer is such that the light passing through the first layer and reflecting off an interface between the first layer and the substrate constructively interferes with the light reflected from the top surface.

3. A light modulator according to claim 2, wherein the substrate is electrically active, and wherein the first layer comprises a dielectric layer and the second layer comprises a conductive interconnect layer.

4. A light modulator according to claim 3, wherein the predetermined thickness of the second layer provides electrical conductivity sufficient to controllably operate the light modulator, and the predetermined thickness of the first layer reduces capacitive coupling to electrically isolate the underlying electrically active substrate from the overlying conductive interconnect layer.

5. A light modulator according to claim 4, wherein each of the first and second layers comprise a predetermined thickness substantially equal to an odd multiple of one-quarter of the wavelength of the light within that layer.

6. A light modulator according to claim 5, wherein each of the first and second layers comprise a predetermined thickness substantially equal to seven quarters of the wavelength of the light within that layer.

7. A light modulator according to claim 2, further comprising a third layer between the top surface and the second layer, the third layer overlying and abutting the first layer; and wherein the third layer has a known refractive index and a predetermined thickness, and the predetermined thickness of the third layer is such that the light passing through the third layer and reflecting off an interface between the second and third layers constructively interferes with light reflected from the top surface.

8. A light modulator according to claim 1, wherein the plurality of reflectivity enhancing layers further comprises an etch stop layer overlying the second layer, and wherein a top surface of the etch stop layer is the top surface of the plurality of reflectivity enhancing layers.

9. A light modulator according to claim 1, wherein the light modulator is selected from the group consisting of:
   ribbon light modulators;
   tilt mirrors light modulators; and
   diaphragm type light modulators.

10. A light modulator according to claim 9, wherein the light modulator is a ribbon light modulator having a plurality of ribbons with reflective surfaces thereon disposed above the substrate, and wherein the reflective surfaces of the plurality of ribbons are separated from the top surface of the substrate by a distance substantially equal to an odd multiple of one-quarter wavelength of the light incident on the light modulator.

11. A light modulator for modulating light incident thereon, the modulator including a substrate having a plurality of reflectivity enhancing layers formed thereon, each of the plurality of reflectivity enhancing layers comprising refractive indices and thicknesses such that the light passing through at least one of the plurality of reflectivity enhancing layers and reflecting off an interface between a first layer and a second layer underlying and abutting the first layer, or off an interface between the first layer and the substrate, constructively interferes with light reflected from a top surface of the plurality of reflectivity enhancing layers.

12. A light modulator according to claim 11 wherein the substrate is electrically active, and wherein the second layer comprises a dielectric layer and the first layer comprises a conductive interconnect layer.

13. A light modulator according to claim 12, wherein the predetermined thickness of the first layer provides sufficiently low electrical resistance for the conductive interconnect layer, and the predetermined thickness of the second layer reduces capacitive coupling between the underlying substrate and the overlying conductive interconnect layer so as to electrically isolate the underlying substrate from the overlying conductive interconnect layer.

14. A light modulator according to claim 13, wherein the first layer comprises a predetermined thickness substantially equal to an odd multiple of one-quarter of a wavelength of the light within the first layer.

15. A light modulator according to claim 14, wherein the first layer comprises a predetermined thickness substantially equal to seven quarters the wavelength of the light within the first layer.

16. A method of manufacturing a light modulator having a substrate with a plurality of reflectivity enhancing layers formed thereon, the method comprising steps of:
   forming a first layer overlying the substrate; and forming a second layer overlying and abutting the first layer, the second layer having a predetermined thickness in relation to an index of refraction of the second layer and to a wavelength of light incident on a top surface of the plurality of reflectivity enhancing layers such that light passing through the second layer and reflecting off an interface between the first and second layers constructively interferes with light reflected from the top surface.

17. A method according to claim 16, wherein the step of forming a first layer comprises forming the first layer overlying and abutting the substrate, the first layer having a predetermined thickness in relation to an index of refraction of the first layer and to the wavelength of the incident light such that the light passing through the first layer and reflecting off an interface between the first layer and the substrate constructively interferes with light reflected from the top surface.

18. A method according to claim 17, wherein the substrate is electrically active, and wherein
the first layer comprises a dielectric layer, and
the second layer comprises a conductive interconnect layer.

19. A method according to claim 18, wherein:
the dielectric layer formed has a predetermined thickness sufficient to reduce capacitive coupling between underlying substrate and the overlying conductive interconnect layer to electrically isolate, and
the conductive interconnect layer formed has a predetermined thickness sufficient to provide a low electrical resistance for the conductive interconnect layer.

20. A method according to claim 17, wherein the predetermined thicknesses of the first and second layers are each substantially equal to an odd multiple of one-quarter of a wavelength of the light in that layer.

* * * * *